United States Patent
Sangra et al.

(10) Patent No.: US 8,671,194 B2
(45) Date of Patent: Mar. 11, 2014

(54) SYSTEM AND METHOD FOR STATELESS, FAULT TOLERANCE AND LOAD BALANCED DATA COLLECTION USING OVERLAY NAMESPACES

(71) Applicant: BMC Software, Inc., Houston, TX (US)

(72) Inventors: Sudhir Sangra, Pune (IN); Geert De Peuter, Turnhout (BE)

(73) Assignee: BMC Software, Inc., Houston, TX (US)

( * ) Notice: Subject to any disclaimer, the term of this patent is extended or adjusted under 35 U.S.C. 154(b) by 0 days.

(21) Appl. No.: 13/932,747

(22) Filed: Jul. 1, 2013

(65) Prior Publication Data

US 2013/0290528 A1    Oct. 31, 2013

Related U.S. Application Data

(62) Division of application No. 13/016,734, filed on Jan. 28, 2011, now Pat. No. 8,478,888.

(51) Int. Cl.
G06F 15/173    (2006.01)

(52) U.S. Cl.
USPC .......................... 709/224; 709/226; 709/229

(58) Field of Classification Search
None
See application file for complete search history.

(56) References Cited

U.S. PATENT DOCUMENTS

| 8,478,888 | B2 | 7/2013 | Sangra et al. |
| 2005/0091214 | A1 | 4/2005 | Probert et al. |
| 2007/0280435 | A1 | 12/2007 | Smith |
| 2007/0299955 | A1 | 12/2007 | Hoffman et al. |
| 2010/0251388 | A1 | 9/2010 | Dorfman |
| 2011/0106777 | A1 | 5/2011 | Yospe et al. |
| 2012/0198049 | A1 | 8/2012 | Sangra et al. |

OTHER PUBLICATIONS

Restriction Requirement dated Oct. 29, 2012, for U.S. Appl. No. 13/016,734, 6 pages.
Non-Final Office Action dated Dec. 17, 2012, for U.S. Appl. No. 13/016,734, 11 pages.
Notice of Allowance dated Apr. 17, 2013, for U.S. Appl. No. 13/016,734, 14 pages.

*Primary Examiner* — Andrew L Nalven
*Assistant Examiner* — Mohammed Waliullah
(74) *Attorney, Agent, or Firm* — Brake Hughes Bellermann LLP

(57) ABSTRACT

A resource monitoring method may include determining, at a first monitoring node, a load level for each monitoring node of a plurality of monitoring nodes including the first monitoring node and a second monitoring node based on a namespace associated with the first monitoring node. The namespace may include an overlay namespace and a local namespace. The local namespace may identify objects being monitored by the first monitoring node. The overlay namespace may include local viewpoints for other monitoring nodes of the plurality of monitoring nodes including the second monitoring node. Each local viewpoint may identify one or more objects that are monitored by a respective other monitoring node. The method may further include prohibiting the first monitoring node from instituting a new object creation request if the load level of the second monitoring node is lower than the load level of the first monitoring node.

17 Claims, 8 Drawing Sheets

SYSTEM AND METHOD FOR STATELESS, FAULT TOLERANCE AND LOAD BALANCED DATA COLLECTION USING OVERLAY NAMESPACES

CROSS-REFERENCE TO RELATED APPLICATION

This application is a divisional of, and claims priority to, U.S. patent application Ser. No. 13/016,734, filed on Jan. 28, 2011, the disclosure of which is hereby incorporated by reference in its entirety.

BACKGROUND

In an Information Technology (IT) environment, resources can be monitored locally or remotely. Regardless which mechanism is used, customers expect the resource to be monitored at all times. Traditionally, multiple nodes (monitoring systems) would be designated to monitor the same resource, to assure fault tolerance in case one of the nodes that is monitoring the resource fails. While this introduces unnecessary load on the monitored resource, it does provide fault tolerance. At the same time this method introduces a side-effect of having duplicate data which means more data to process as the data is moved upstream. Instead of monitoring the resource redundantly, it would be possible to designate a central coordinator to tell which system should be effectively monitoring the resource. One of the benefits of having a central coordinator dispatch work is that load balancing is easily built into the solution. However, employing a central coordinator introduces at least two additional complexities: (1) The coordinator is now a single point of failure (which means it should be made fault tolerant); and (2) When the connection between the coordinator and the active collection system drops, recovery is limited to instructing another node to take over the workload.

Another aspect of fault tolerance is the prevention of data loss. The traditional way of solving data loss is by moving data to a central (fault tolerant) system as soon as possible. This means that all data has to be sent to a central server which introduces a significant overhead in the case where all data is not required on the central server.

There is a need, therefore, for a mechanism that minimizes duplication of data collection, and still maintains load balancing and fault tolerance.

SUMMARY

Various embodiments disclose systems, methods and computer readable media for stateless, fault tolerance and load balanced data collection using overlay namespaces. In one embodiment, a method is disclosed that creates a monitoring object for a resource. When a monitoring node detects a resource waiting to be monitored, it generates an object creation request, and forwards the request to all linked namespaces. If any of the responses received from the linked namespaces is "creation not allowed", object creation stops. Otherwise, the requesting node creates an object for the resource, and maps the object to the node's namespace.

In another embodiment, a method is disclosed that balances the load between monitoring nodes. When a node's load reaches a predefined maximum load level, the node stops monitoring more resources. The node may also determine the load levels on other nodes in the monitoring cluster, and compares those load levels with the load on itself. If any of the load levels of the other nodes is low, the node may stop monitoring a resource, and destroy the object associated with that resource, and let other nodes take over the monitoring of that resource.

In yet another embodiment, a resource monitoring system is disclosed that includes a processor, a storage subsystem coupled to the processor, and a software program, application or module stored in the storage subsystem, having instructions that when executed by the processor cause the processor to perform one of the methods described herein.

In still another embodiment, a non-transitory computer readable medium is disclosed (a program storage device) that comprises instructions for causing a programmable control device to perform one of the methods described herein.

In yet another embodiment, a networked computer system is disclosed that includes a plurality of computers communicatively coupled, at least one of the plurality of computers programmed to perform at least a portion of a method described herein wherein the entire method is performed collectively by the plurality of computers.

DETAILED DESCRIPTION

Figure 1:
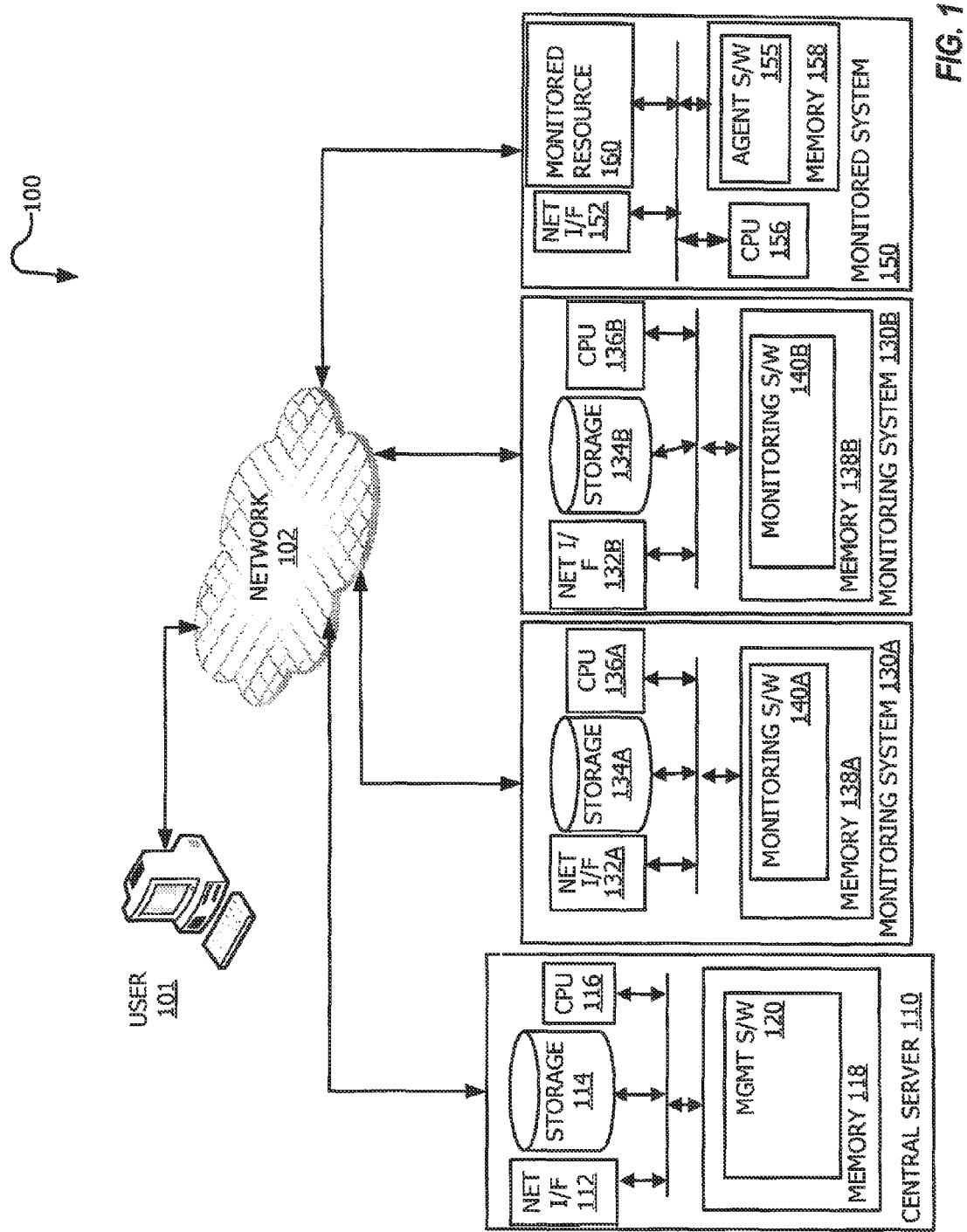
FIG. 1 illustrates an example monitoring system.

Various embodiments disclose systems, methods and computer readable media that provide stateless fault tolerance and load balanced data collection using overlay namespaces. In accordance with one embodiment, a resource monitoring cluster may be used to handle failover/load balance operations in which each node of the cluster comprises a monitoring system which is capable of monitoring a target resource. A data provider process may also run on each node in the cluster. Each node has a namespace, which includes local namespaces for objects monitored by the node, and an overlay. The overlay of a namespace comprises one or more links to namespaces on other nodes. The overlay may also comprise local viewpoints of those linked namespaces. When a node detects a resource waiting to be monitored, it will try to create an object corresponding to that resource to monitor the resource. The node first queries other nodes in the cluster to determine whether object creation for that resource is allowed. The node creates an object only if no other node is creating an object for that resource. A node may stop monitoring more resources if the load on the node reaches a predetermined level. The node may also stop monitoring a resource if it determines the load level on another node is low.

In the following description, for purposes of explanation, numerous specific details are set forth in order to provide a thorough understanding of the invention. It will be apparent to one skilled in the art, however, that the invention may be practiced without these specific details. In other instances, structure and devices are shown in block diagram form in order to avoid obscuring the invention. In addition, references to numbers without subscripts are understood to reference all instance of subscripts corresponding to the referenced number. It will be appreciated that in the development of any actual implementation (as in any development project), numerous decisions must be made to achieve the developers' specific goals (e.g., compliance with system- and business-related constraints), and that these goals will vary from one implementation to another. It will also be appreciated that such development effort might be complex and time-consuming, but would nevertheless be a routine undertaking for those of ordinary skill in the art having the benefit of this disclosure. Moreover, the language used in this disclosure has been principally selected for readability and instructional purposes, and may not have been selected to delineate or circumscribe the inventive subject matter, resort to the claims being necessary to determine such inventive subject matter. Reference in the specification to "one embodiment" or to "an embodiment" means that a particular feature, structure, or characteristic described in connection with the embodiments is included in at least one embodiment of the invention, and multiple references to "one embodiment" or "an embodiment" should not be understood as necessarily all referring to the same embodiment.

FIG. 1 illustrates example resource monitoring system 100 that incorporates elements that provide stateless fault tolerance and load balancing data collection when monitoring a resource. System 100 includes central center 110 coupled to network 102, which provides connectivity between central server 110, one or more user nodes 101 and two or more monitoring systems 130 (130A and 130B), and monitored resource 160 residing on monitored system 150. Such connectivity is provided via each system's network interface (e.g., network interfaces 112, 132 and 152). Although example system 100 shows only one monitored resource on one monitored system for simplicity, any number of resources on any number of any of a wide variety of computer systems may be monitored using the systems and methods described, including stand-alone computer systems, client computer systems and mainframe computer systems, just to name a few examples.

Example central server 110 includes management software 120, which is loaded into memory 118 and executed by CPU 116. Central server 110 also includes persistent storage device 114 (e.g., a hard disk drive), used to store configuration settings of management software 120. Central server 110 communicates with monitoring systems 130, collects data from monitoring systems 130 and stores data in storage 114. Example monitoring systems 130 include monitoring software 140 (140A and 140B) which when loaded into memory 138 (138A and 138B) may be executed by CPU 136 (136A and 136B), and which may also provide at least some of the monitoring functionality described herein. Example monitored system 150 includes agent software 155 which may be loaded into memory 158 and executed by CPU 156. Monitoring software 140 communicates, via network interface 132 (132A and 132B) with agent software 155 on monitored system 150 (via network interface 152) to monitor monitored resource 160. Monitored resource 160 includes, but is not limited to, hardware (such as CPU, memory, disk and network) and software (such as file handles and modules). Storage 134 (134A and 134B) may be used to store configuration settings for monitoring software 140.

A monitoring cluster may be statically defined as a group of monitoring systems at startup time. A cluster in the instant disclosure may be defined from the perspective of the target resource that is to be monitored. Cluster members (nodes) are monitoring systems, such as 130A and 130B in FIG. 1, which are capable of monitoring that resource and through configuration can do so. A monitoring system that is capable of monitoring multiple resources could therefore simultaneously participate in multiple clusters. For simplicity, this disclosure only describes monitoring of a single resource wherein any given monitoring system participates in only a single cluster at any given time. One of ordinary skill in the art will recognize these limitations are not an inherent feature of the disclosure.

Figure 2:
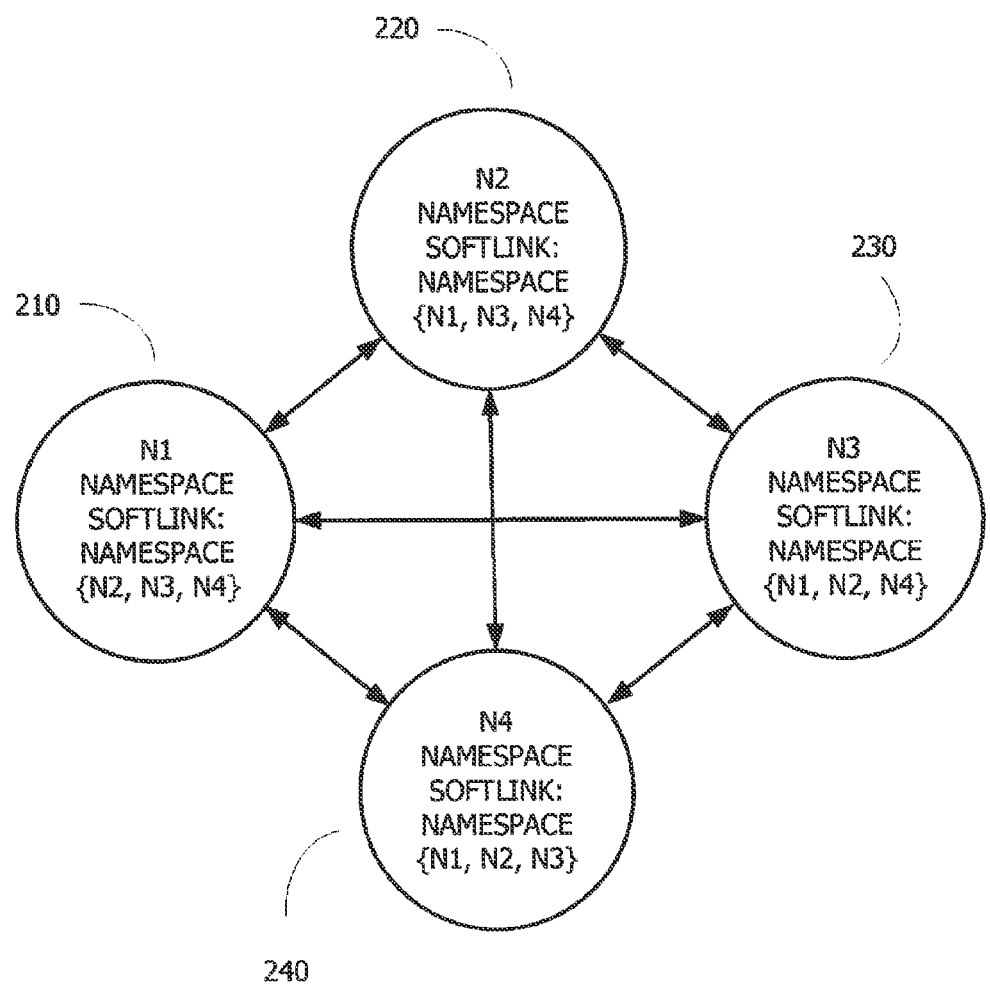
FIG. 2 illustrates example namespaces and overlay namespaces communicatively coupled with each other according to one embodiment.

A data provider process may run on each node in the cluster. A data provider process running on each monitoring system can have its own namespace which can store characteristics and configuration information for the data provider process, including the node's current load. A node's namespace may be linked to some or all of the namespaces of the processes running on peer nodes in the cluster, wherein the linked namespaces are referred to herein as overlaid namespaces. FIG. 2 illustrates example namespaces according to one embodiment. As shown, each node (210, 220, 230 and 240) may have its own namespace (N1, N2, N3 and N4). A namespace may also contain softlinks to other namespaces. For example, namespace N1 may contain links to namespaces N2, N3 and N4. Each linked namespace can have a local viewpoint created in the overlay namespace. In this way, an overlay namespace can provide two-way communications by providing links to remote namespaces while also providing local viewpoints of the linked namespaces. The local viewpoint of a remote namespace can provide a snapshot of the remote namespace. In one embodiment, nodes communicate with each other on secure channels which may use, for example, a key based or user/password authenticated technique.

Figure 3:
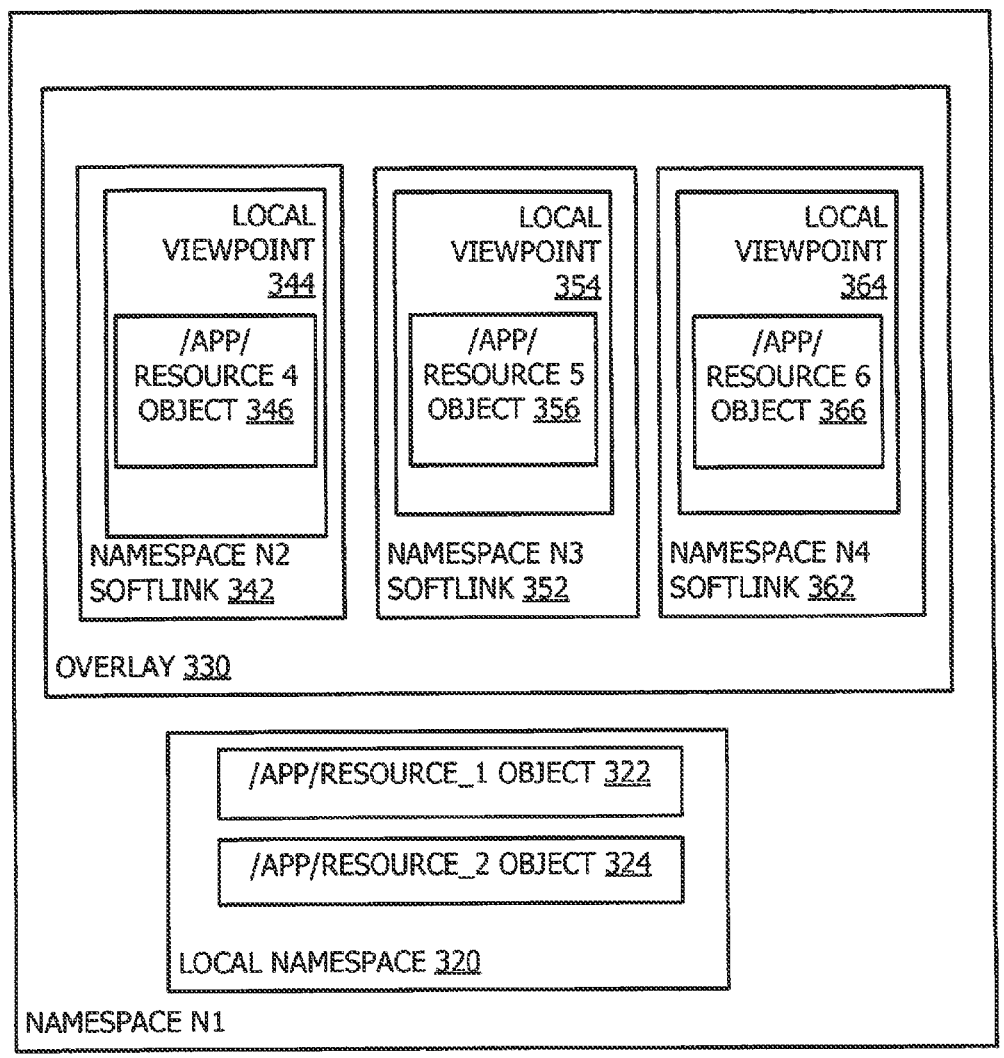
FIG. 3 illustrates an example namespace according to one embodiment.

FIG. 3 illustrates example namespace N1 in block diagram form. As shown, namespace N1 has local namespace 320 which mounts two objects of monitored resources: resource_1 object 322 and resource_2 object 324. Overlay 330 of namespace N1 contains softlinks to namespaces on other nodes in the cluster: softlink 342 linked to namespace N2, softlink 352 linked to namespace N3 and softlink 362 linked to namespace N4. Each softlink may have a local viewpoint of the corresponding linked namespace, for example, softlink 342 has local viewpoint 344 which contains object 346 corresponding to a monitored resource mounted on namespace N2; softlink 352 has local viewpoint 354 which contains object 356 corresponding to a monitored resource mounted on namespace N3; and softlink 362 has local viewpoint 364 which contains object 366 corresponding to a monitored resource mounted on namespace N4.

Figure 4:
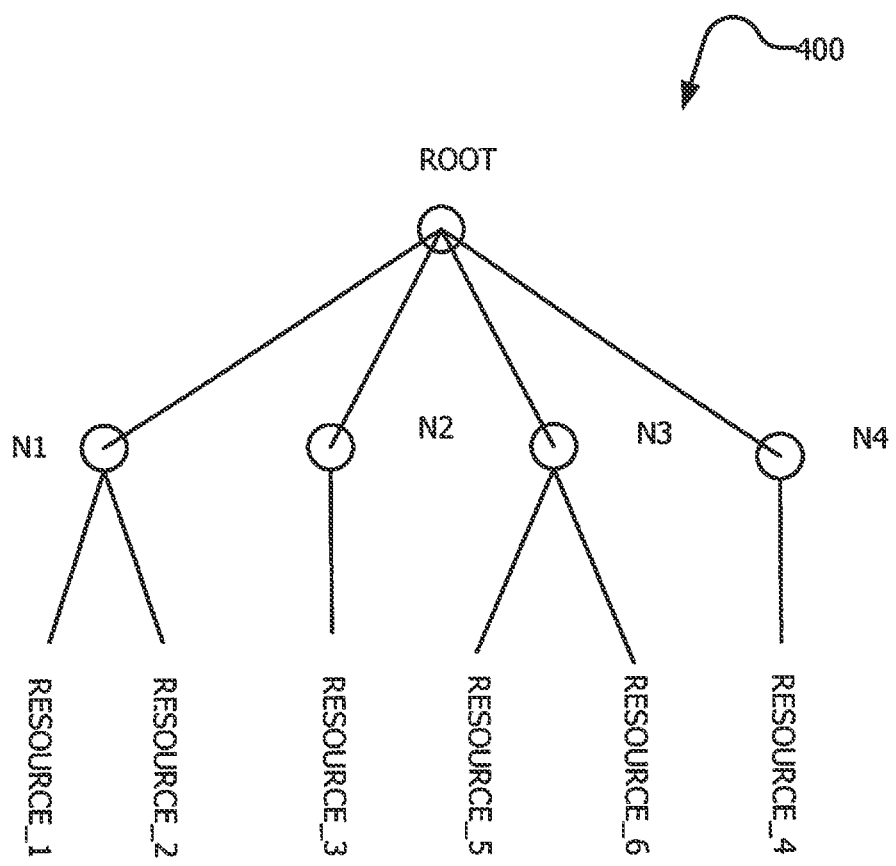
FIG. 4 illustrates an example namespace tree structure according to one embodiment.

FIG. 4 illustrates example cluster namespace tree 400. Each monitoring system maps its monitored resources to a namespace subtree. For example, objects of resource_1 and resource_2 are mounted to the namespace N1 subtree. Each subtree has a well-defined unique owner (the provider node). In an overlay namespace, a namespace subtree may be modified (i.e., written to) by the subtree owner. All other nodes that participate in a cluster may have read-only access to that namespace subtree. Subtree mounting happens transparently to the participating nodes as a new node joins a cluster. When a node in the cluster creates a subtree, all the other nodes may mount that same subtree in read-only mode. If the subtree owner leaves the cluster, its mounted subtree may also automatically be un-mounted from the remaining nodes in the cluster.

Figure 5:
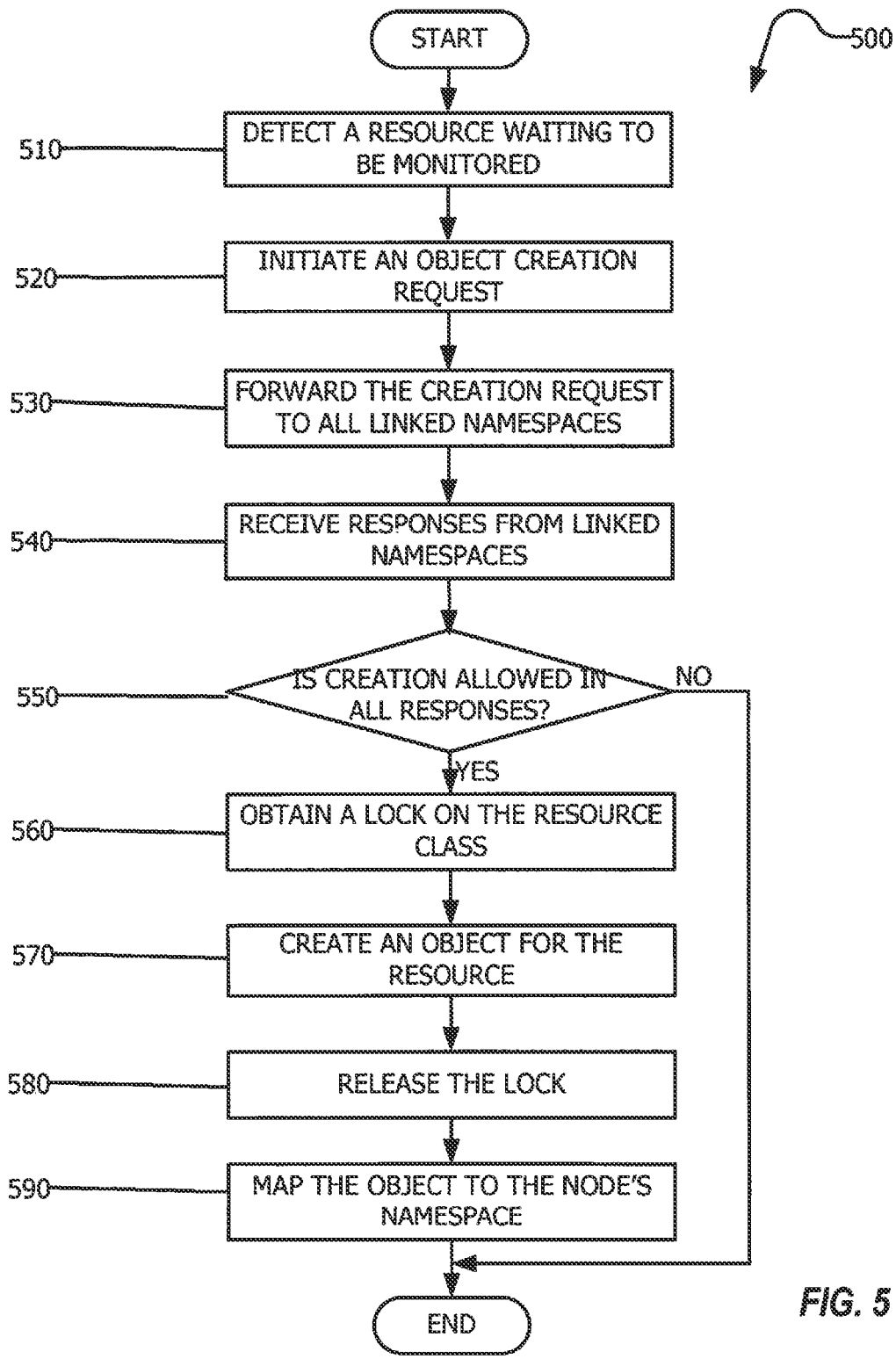
FIG. 5 illustrates, in flowchart form, a method for starting to monitor a resource by a monitoring system according to one embodiment.

FIG. 5 illustrates process 500 that creates a monitoring object for a target resource at a participating node in a cluster. When a node detects a resource waiting to be monitored via agent software 155, block 510, the node can initiate a request to create an object for the target resource, block 520. The node may forward the creation request to all linked namespaces in the overlay namespace, block 530, and receive responses back from all of the linked namespaces, block 540. If a linked namespace has already started creating an object for that resource, or if a linked namespace has obtained a lock on the resource, that namespace may send a response back to the requester node with an answer "creation not allowed." If any one of the cluster nodes returns "creation not allowed", object creation stops, "No" prong of block 550. On the other hand, if the result for the creation request is "creation allowed" in all of the responses, "Yes" prong of block 550, then the node obtains a lock on the resource, block 560, creates an object for the resource, block 570, releases the lock, block 580, and mounts the object to the node's namespace, block 590. In another embodiment, the requesting node may issue an object creation request and, barring receipt of a "creation not allowed" message, proceeds to block 560. In still another embodiment, after issuing its object creation request, the requesting node may proceed to lock 560 if a "creation not allowed" message is not received within a specified timeframe. When object creation starts on a node, a distributed lock may be held on the monitored resource to prevent other nodes from creating another monitoring object for the same monitored resource. If any other node in a cluster tries to create an object for the target resource, it can check the local viewpoint of the overlay namespace and, if there is a lock on the target resource, can abort object creation on that node. In one embodiment, a distributed lock may be generated using a Paxos algorithm.

For a newly created object of a target resource, the provider node (i.e., the node that created the object) hosts the local namespace for the object. The namespace may also include the object's metadata. An object's metadata may comprise detailed object information. The object's metadata includes, but is not limited to, creation time, modification time, and a flag to indicate whether the object is modified or not, etc. The object's metadata may be propagated to all of the linked namespaces in the overlay namespace and local viewpoints of the respective peers can thereafter be updated. In one embodiment, when the object is read by another node, the object may then be made available in the local viewpoint of the provider namespace on the requester node. Detailed steps of a typical read process will be discussed later in this disclosure.

When an object undergoes write/modify operations, the metadata related to the object may be updated in the overlay namespace of the provider node as well as local viewpoints of the provider namespace at remote nodes. Until the object is read by a remote node, the local viewpoint of the object in the overlay namespace of the respective node may not be updated. This "lazy" updating of local viewpoints may help improve performance.

An object's metadata may also comprise information as little as an indication that the object is dirty (i.e., has been modified). Metadata update can be done as part of a lock/unlock operation. When a lock on the object is successfully obtained, the object may be marked as dirty. When the lock on the object is release, the object's metadata may be updated in terms of what has been changed.

Figure 6:
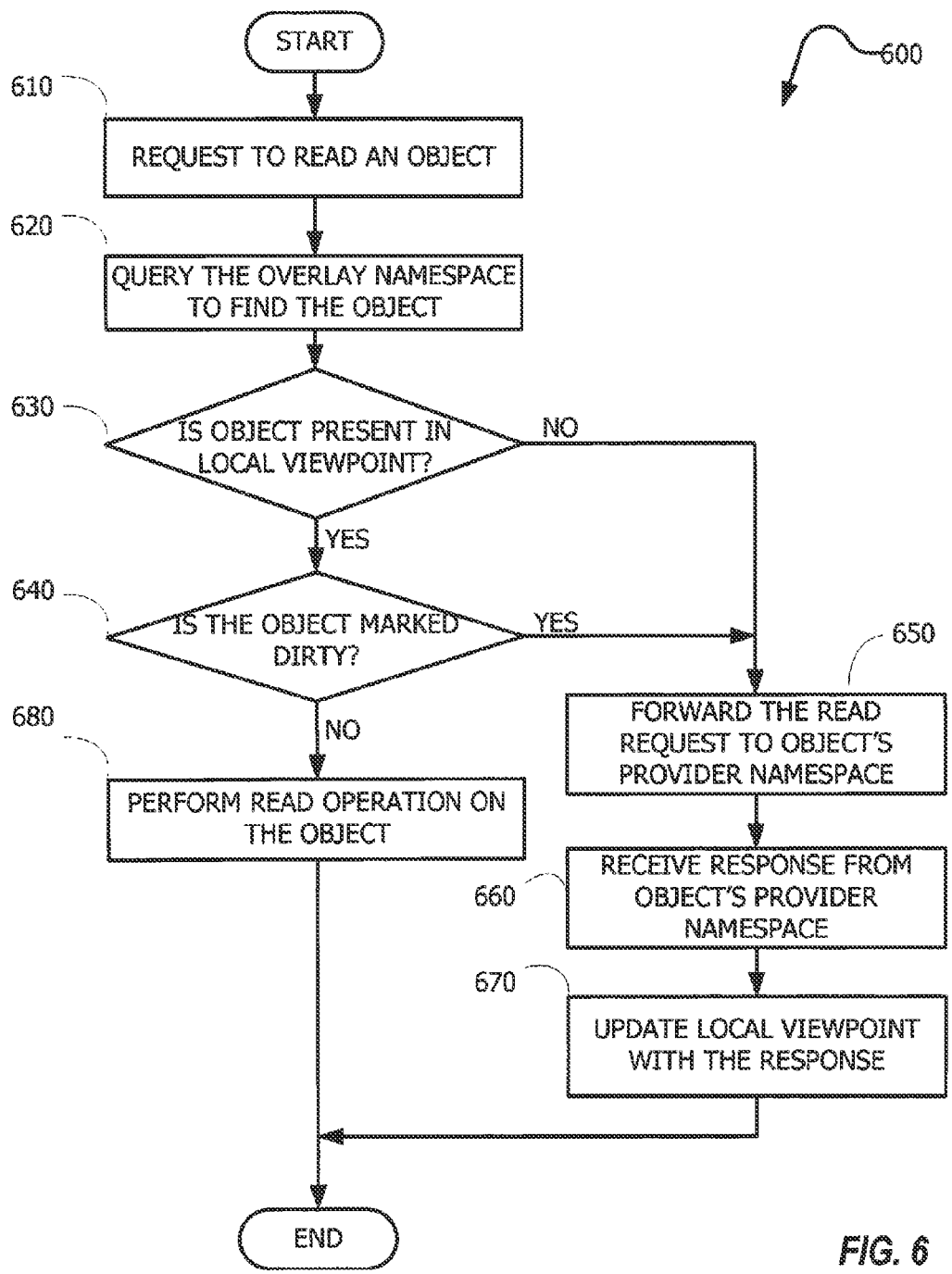
FIG. 6 illustrates, in flowchart form, a method for reading an object according to one embodiment.

FIG. 6 shows illustrative read operation 600 in accordance with one embodiment. When a node requests to perform a read operation on an object, block 610, the overlay namespace of the node may be queried, block 620. If the requester node is the object's provider node, the read operation may be performed on the object which is mounted to the node's subtree. However, if the requester node is not the provider node of the object, the local viewpoint of provider namespace may be queried first before querying the linked namespace of the provider node in the overlay. If the object is not present in the calling node's local viewpoint, "No" prong of block 630, or if the object is dirty, "Yes" prong of block 640, the read request may be forwarded to the actual provider of the object, block 650. The read operation may then be performed on the object at the object's provider namespace, and the requested information sent back to the caller node. Once the information requested is received at the caller node, block 660, the local viewpoint of the provider namespace at the caller node may be updated, block 670. This update may be made only when necessary to help reduce network calls/traffic, in the case that the object may be present in the local viewpoint of overlay namespace and it is not dirty. In that case, the read operation may be performed directly on the object in the local viewpoint, block 680.

Each node can be provisioned identically. Each node in the cluster can perform data collection independent of other nodes in the cluster. Each node may have a pre-specified load level threshold. When the load on a node increases to its pre-specified threshold, the node can stop performing operations for further resources. Other nodes in the cluster may start monitoring the incoming resources. In another embodiment, a node's load level may be adjusted dynamically based on resources available to it (e.g., increased as additional computational, memory or storage capacity is added).

Figure 7:
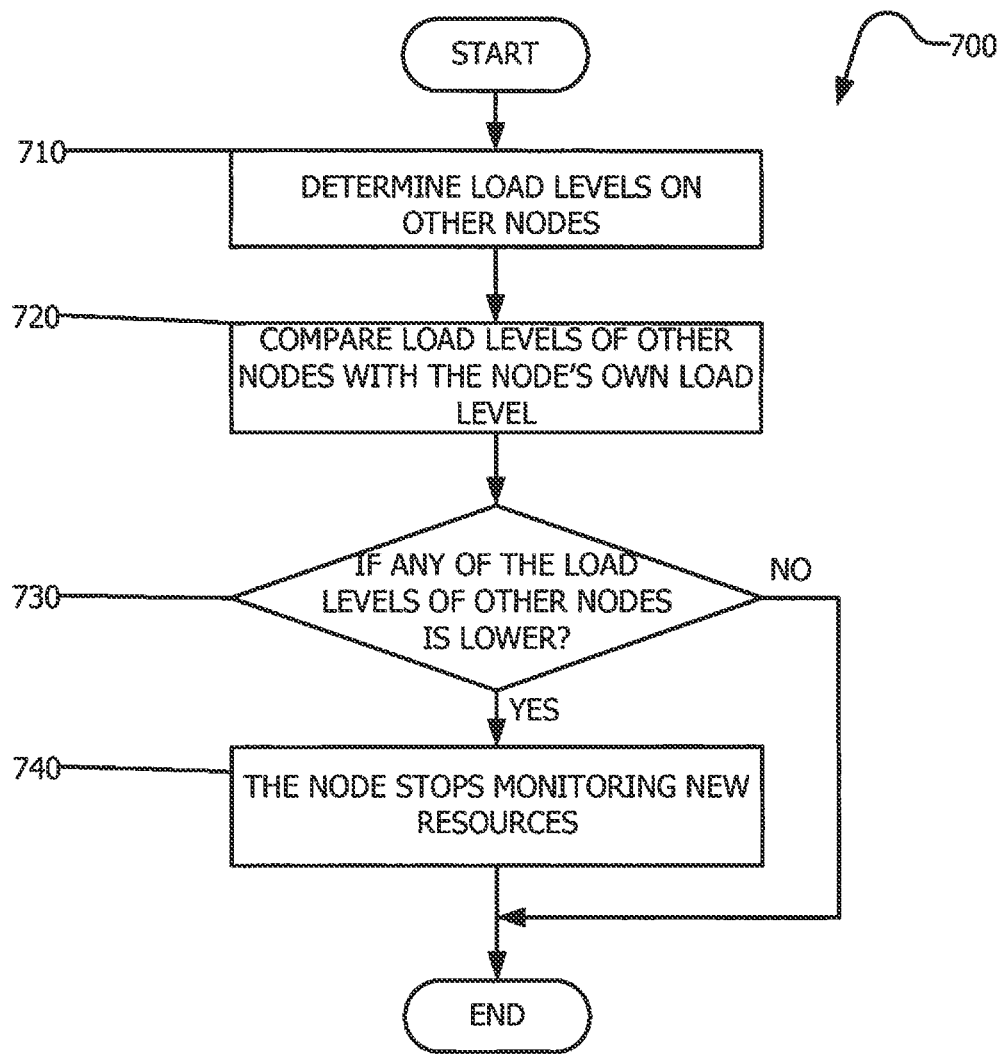
FIG. 7 illustrates, in flowchart form, a method for balancing the load between nodes according to one embodiment.

FIG. 7 illustrates, in process 700, another load balancing scenario. Through the local viewpoints of the linked namespaces, any node may determine load levels on other nodes in the cluster, block 710, and compare those load levels with the node's own load level, block 720. The load level for each node may be determined from the local viewpoint of that node on the determining node. Anytime a node begins monitoring a new resource, it broadcasts the metadata of an object corresponding to that resource to all the peer nodes in the cluster. The load level of the broadcasting node may also be updated on local viewpoints of that node on its peer nodes. If a node determines that the load level on one or more nodes in the cluster is lower than the node's own load level, "Yes" prong of block 730, the node may stop performing operations for further resources. Other nodes in the cluster with a lower load level may start monitoring the incoming resources, block 740. In one embodiment, a node may determine that the load on one or more nodes in the cluster is at a very low level compared to the node's own load, the node may then select a resource from a set of resources monitored by the node, stop monitoring that resource and destroy its monitoring object corresponding to that resource. A system administrator may define the triggering low load level. For instance, the load level on another node is 50% of the node's own load level may be defined to trigger the above described load balancing operation. While the resource is waiting to be monitored, the node with a low load level may initiate the object creation process described above. If no other node has placed a lock on the resource, the node with the low load level may obtain a lock on the resource, create an object of the resource, and take over the monitoring of that resource as described with respect to FIG. 5.

There may be shared resources between peer nodes in a cluster. For example, for an Oracle® RAC system, the database storage is the same for all objects, but the object level information is specific to each object running on a node in the cluster. (ORACLE is a registered trademark of the Oracle Corporation.) If discovery starts on all nodes, and each node discovers the database resource independently, then data collected for the database resource may be duplicated. Using overlay namespaces described herein, only a single node may be allowed to provide data for the shared resource, because creation of a resource object depends on the linked namespace as described above. This enables each node in a cluster to perform object/node specific monitoring and only one node in the cluster participates in the shared resource data collection.

In some cases, a provider of an object may be unreachable due to node failure or network communication failure between peer nodes. When the provider namespace becomes unreachable, the overlaid object's provider link may be marked as dead for write/read operations in all the peers until another node takes over the role of the data provider of that object. In one embodiment, if the provider namespace is not alive for an overlaid object, the remaining nodes may participate in object creation. This means, if multiple nodes can access the object, but they cannot connect to the last known provider namespace of the object, these multiple nodes may all participate in object creation and a new provider may be established between the remaining nodes as described above. During this process the first node that detects failure of the provider node may notify the other nodes, so that all remaining nodes can decide to mark the current provider as dead. The node that is able to create the object will acquire responsibility for providing the data.

In one embodiment, a monitoring node may be running but somehow become detached from a cluster. In such a case, the node may choose to continue performing operations which are not executed on linked namespaces and ignore operations which are related to linked namespaces. The node may also continue the operations on linked namespaces assuming that it is the only peer/node in the cluster and then synchronize the data on its namespace with the data on the linked namespaces when/if the node rejoins the cluster.

In a cluster, it is possible that a quorum of nodes may not be established, such a cluster is called a degraded cluster. For example, if both nodes in a two-node cluster get disconnected from each other, the nodes do not know which node is collecting data on targeted resources. This scenario is called "split brain". In a split brain situation, a node which cannot establish a quorum, may decide to collect data while the cluster is degraded. It is also possible that a node which is isolated from the rest of the cluster may contact an upstream node which can handle arbitration as to whether data collection is required or not.

In one embodiment, a cluster may be configured to continue collecting data in a degraded form. Upon reestablishment of a quorum, two nodes may have already created objects for a given resource and are therefore hosting the same local namespace. In this scenario, a leader node may be selected for the specific resource to decide what needs to happen with the data that was collected by the node while it was unreachable. The data collected by the unreachable node may be discarded or merged. The leader may also decide who gets to own the local namespace and who must switch to using an overlay namespace. In one embodiment, a Paxos algorithm may be used to select the leader node.

In one embodiment, one node may become disconnected from a three-node cluster. The disconnected node may not know whether the remaining two nodes are collecting data or not. The disconnected node may continue to monitor a resource it can possibly connect to. By the time the disconnected node rejoins the cluster, there may already be a local namespace for that resource created in one of the other nodes in the cluster. When rejoining the cluster, the previously disconnected node may announce itself to its peers in the cluster, but does not expect to be promoted to be the leader. In one embodiment, the leader node may decide to let the segregated node take the leadership role.

History data of an object can be stored locally on the object's provider node. In the case where another node in the cluster takes over the provider role for the monitored resource, the history data can be stored locally on the new provider node. History data of a monitoring object may be present on nodes that have played the role of the provider during the lifetime of the object. A history request of data relating to a monitored resource from any node external to a cluster or from peers in the cluster can be fulfilled by collecting the data from all linked namespaces if the object is present in the local viewpoint of an overlay namespace. The data may be retrieved from all linked namespaces in the cluster to form a complete snapshot for the requested time.

In addition to fault tolerance in data collection, there is often a need to provide fault tolerance in the collected data. In one embodiment, data fault tolerance may be achieved through a two-tier node selection. The provider node of an object may store information about which nodes have a mounted overlay namespace corresponding to the provider node. Out of those nodes, the provider node may select a second tier node and request the second tier node mount the overlay namespace of the provider node in real-time and also store the historical data for the object. In that way, there are two copies of the data available in the cluster at any given time.

Figure 8:
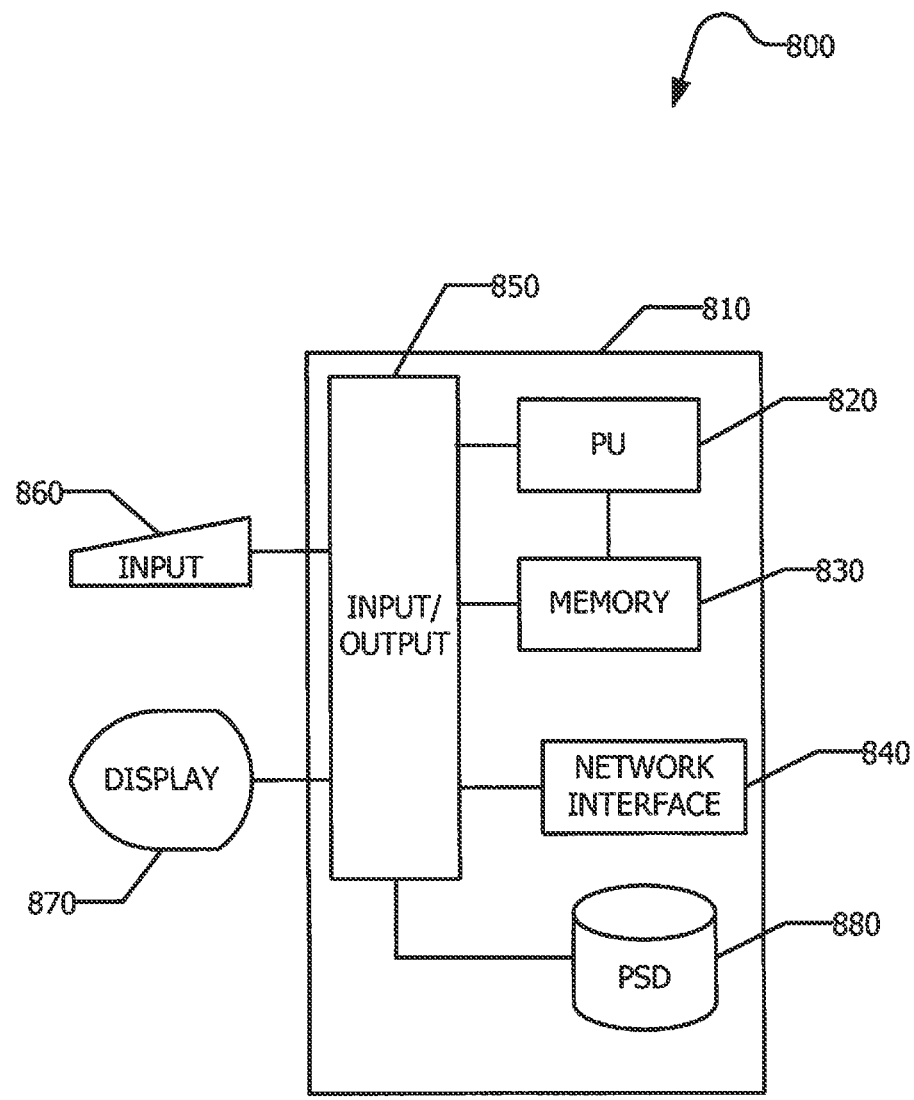
FIG. 8 illustrates, in block diagram form, an example computer system which might be utilized to implement various embodiments disclosed herein.

FIG. 8 shows example computer system 800. Example computer system 800 may be used as central server 110 and/or monitoring system 130. Example computer 800 comprises system unit 810 which may be optionally connected to one or more input devices 860 (e.g., keyboard, mouse, touch screen, etc.) and display 870. Program storage device (PSD) 880 is included within system unit 810. Also included within system unit 810 is network interface 840 for communication with other devices via a network (not shown). Network interface 840 may be included within system unit 810 or be external to system unit 810. In either case, system unit 810 may be communicatively coupled to network interface 840. Program storage device 880 represents any form of non-volatile storage including, but not limited to, all forms of optical and magnetic storage, including solid-state, storage elements and removable media. Program storage device 880 may be used for storage of software to control system unit 810 in, data for use by the computer 800, or both.

System unit 810 may be programmed to perform methods in accordance with this disclosure (an example of which is shown in FIG. 5). System unit 810 comprises processor unit (PU) 820, input-output (I/O) interface 850 and memory 830. Processing unit 820 may include any programmable controller device including, for example, one or more members of the Intel Atom®, Core®, Pentium® and Celeron® processor families from Intel and the Cortex and ARM processor families from ARM. (INTEL, INTEL ATOM, CORE, PENTIUM, and CELERON are registered trademarks of the Intel Corporation. CORTEX is a registered trademark of the ARM Limited Corporation. ARM is a registered trademark of the ARM Limited Company.) Memory 830 may include one or more memory modules and comprise random access memory (RAM), read only memory (ROM), programmable read only memory (PROM), programmable read-write memory, and solid-state memory. One of ordinary skill in the art will also recognize that PU 820 may also include some internal memory including, for example, cache memory.

In addition, acts in accordance with the methods of FIGS. 5, 6 and 7 may be performed by example computer system 800 including a single computer processor, a special purpose processor (e.g., a digital signal processor, "DSP"), a plurality of processors coupled by a communications link or a custom designed state machine, or other device capable of executing instructions organized into one or more program modules. Custom designed state machines may be embodied in a hardware device such as an integrated circuit including, but not limited to, application specific integrated circuits ("ASICs") or field programmable gate array ("FPGAs").

Various changes in the components as well as in the details of the illustrated operational method are possible without departing from the scope of the following claims. For example, the illustrative system of FIG. 1 may be comprised of more than one computer communicatively coupled via a communication network, wherein the computers may be mainframe computers, minicomputers, workstations or any combination of these. Further, monitored applications may execute on multiple hardware platforms. Such a network may be composed of one or more local area networks, one or more wide area networks, or a combination of local and wide-area networks. In addition, the networks may employ any desired communication protocol and further may be "wired" or "wireless." Acts in accordance with FIG. 5 may be performed by a programmable control device executing instructions organized into one or more program modules. A programmable control device may be a single computer processor, a special purpose processor (e.g., a digital signal processor, "DSP"), a plurality of processors coupled by a communications link or a custom designed state machine. Custom designed state machines may be embodied in a hardware device such as an integrated circuit including, but not limited to, application specific integrated circuits ("ASICs") or field programmable gate array ("FPGAs"). Storage devices suitable for tangibly embodying program instructions include, but are not limited to: magnetic disks (fixed, floppy, and removable) and tape; optical media such as CD-ROMs and digital video disks ("DVDs"); and semiconductor memory devices such as Electrically Programmable Read-Only Memory ("EPROM"), Electrically Erasable Programmable Read-Only Memory ("EEPROM"), Programmable Gate Arrays and flash devices.

It is to be understood that the above description is intended to be illustrative, and not restrictive. For example, the above-described embodiments may be used in combination with each other. Many other embodiments will be apparent to those of skill in the art upon reviewing the above description. The scope of the invention therefore should be determined with reference to the appended claims, along with the full scope of equivalents to which such claims are entitled. In the appended claims, the terms "including" and "in which" are used as the plain-English equivalents of the respective terms "comprising" and "wherein."

What is claimed is:

1. A resource monitoring method comprising:
   determining, at a first monitoring node, a load level for each monitoring node of a plurality of monitoring nodes including the first monitoring node and a second monitoring node based on a namespace associated with the first monitoring node, the namespace including an overlay namespace and a local namespace, the local namespace identifying objects being monitored by the first monitoring node, the overlay namespace including local viewpoints for other monitoring nodes of the plurality of monitoring nodes including the second monitoring node, each local viewpoint identifying one or more objects that are monitored by a respective other monitoring node, the determining including
   determining, by the first monitoring node, the load level for the first monitoring node based on one or more attributes included within the local namespace, configuration or system attributes associated with the first monitoring node, or a combination thereof; and
   determining, by the first monitoring node, the load level for the second monitoring node based on one or more attributes included within the local namespace of the first monitoring node, one or more attributes included within the local viewpoint associated with the second monitoring node, configuration or system attributes associated with the first monitoring node, or a combination thereof; and
   prohibiting the first monitoring node from instituting a new object creation request if the load level of the second monitoring node is lower than the load level of the first monitoring node.

2. The resource monitoring method of claim 1, wherein the determining includes:
   determining, by the first monitoring node, load levels for the other monitoring nodes based on one or more attributes included within the local namespace of the first monitoring node, one or more attributes included within the local viewpoints, configuration or system attributes associated with the first monitoring node, or a combination thereof;
   determining if any of the load levels for the other monitoring nodes is lower than the load level for the first monitoring node; and
   prohibiting the first monitoring node from instituting the new object creation request if any of the load levels of the other monitoring nodes is lower than the load level of the first monitoring node.

3. The resource monitoring method of claim 1, further comprising:
   determining that the load level for at least one other monitoring node meets a condition as compared to the load level for the first monitoring node based on the local namespace and the local viewpoints; and
   stopping monitoring at least one object being monitored by the first monitoring node.

4. The resource monitoring method of claim 3, further comprising:
   destroying the at least one object being monitored by the first monitoring node from the local namespace.

5. The resource monitoring method of claim 1, further comprising:
   evaluating load constraints to determine whether the load level of the first monitoring system reaches a condition;
   stopping a discovery of any new objects or removing the at least one object from being monitored by the first monitoring node if the load level of the first monitoring node reaches the condition.

6. The resource monitoring method of claim 1, further comprising:
   instituting the new object creation request if the load level of the second monitoring is higher than the load level of the first monitoring node.

7. The resource monitoring method of claim 6, further comprising:
   issuing the new object creation request for a new object to the other monitoring nodes;
   receiving responses to the new object creation request from the other monitoring nodes;
   determining an allowability of the new object creation request based on the responses; and
   mapping the new object to the local namespace of the first monitoring node.

8. The resource monitoring method of claim 1, further comprising:
   receiving a request to perform a read operation on an object at the first monitoring node;
   determining whether or not a copy of the object is present in the namespace associated with the first monitoring node; and
   performing, by the first monitoring node, the read operation on the object if the copy of the object is determined as present in the namespace associated with the first monitoring node.

9. A system for monitoring resources, the system comprising:
   at least one processor;
   a non-transitory computer-readable medium including instructions executable by the at least one processor, the instructions configured to implement,
   a monitoring agent, configured to determine, at a first monitoring node, a load level for each monitoring node of a plurality of monitoring nodes including the first monitoring node and a second monitoring node based on a namespace associated with the first monitoring node, the namespace including an overlay namespace and a local namespace, the local namespace identifying objects being monitored by the first monitoring node, the overlay namespace including local viewpoints for other monitoring nodes of the plurality of monitoring nodes including the second monitoring node, each local viewpoint identifying one or more objects that are monitored by a respective other monitoring node; and
   the monitoring agent configured to prohibit the first monitoring node from instituting a new object creation request if the load level of the second monitoring node is lower than the load level of the first monitoring node,
   wherein the monitoring agent is configured to determine the load level for the first monitoring node based on one or more attributes included within the local namespace, configuration or system attributes associated with the first monitoring node, or a combination thereof, the monitoring agent configured to determine the load level for the second monitoring node based on one or more attributes included within the local namespace of the first monitoring node, one or more attributes included within the local viewpoint associated with the second monitoring node, configuration or system attributes associated with the first monitoring node, or a combination thereof.

10. The system of claim 9, wherein the monitoring agent is configured to determine load levels for the other monitoring nodes based on one or more attributes included within the local namespace of the first monitoring node, one or more attributes included within the local viewpoints, configuration or system attributes associated with the first monitoring node, or a combination thereof, the monitoring agent configured to determine if any of the load levels for the other monitoring nodes is lower than the load level for the first monitoring node, and prohibit the first monitoring node from instituting the new object creation request if any of the load levels of the other monitoring nodes is lower than the load level of the first monitoring node.

11. The system of claim 9, wherein the monitoring agent is configured to determine that the load level for at least one other monitoring node meets a condition as compared to the load level for the first monitoring node based on the local namespace and the local viewpoints, and stop monitoring at least one object being monitored by the first monitoring node.

12. The system of claim 9, wherein the monitoring agent is configured to institute the new object creation request if the load level of the second monitoring is higher than the load level of the first monitoring node.

13. The system of claim 12, wherein the monitoring agent is configured to issue the new object creation request for a new object to the other monitoring nodes, receive responses to the new object creation request from the other monitoring nodes, determine an allowability of the new object creation request based on the responses, and map the new object to the local namespace of the first monitoring node.

14. A non-transitory computer-readable medium storing instructions that when executed cause at least one processor to monitor resources, the instructions comprising instructions to:
   determine, at a first monitoring node, a load level for each monitoring node of a plurality of monitoring nodes including the first monitoring node and a second monitoring node based on a namespace associated with the first monitoring node, the namespace including an overlay namespace and a local namespace, the local namespace identifying objects being monitored by the first monitoring node, the overlay namespace including local viewpoints for other monitoring nodes of the plurality of monitoring nodes including the second monitoring node, each local viewpoint identifying one or more objects that are monitored by a respective other monitoring node, wherein the instructions to determine include instructions to
   determine the load level for the first monitoring node based on one or more attributes included within the local namespace, configuration or system attributes associated with the first monitoring node, or a combination thereof; and
   determine the load level for the second monitoring node based on one or more attributes included within the local namespace of the first monitoring node, one or more attributes included within the local viewpoint associated with the second monitoring node, configuration or system attributes associated with the first monitoring node, or a combination thereof; and
   prohibit the first monitoring node from instituting a new object creation request if the load level of the second monitoring node is lower than the load level of the first monitoring node.

15. The non-transitory computer-readable medium of claim 14, wherein the instructions to determine include instructions to:
   determine load levels for the other monitoring nodes based on one or more attributes included within the local namespace of the first monitoring node, one or more attributes included within the local viewpoints, configuration or system attributes associated with the first monitoring node, or a combination thereof;
   determine if any of the load levels for the other monitoring nodes is lower than the load level for the first monitoring node; and prohibit the first monitoring node from instituting the new object creation request if any of the load levels of the other monitoring nodes is lower than the load level of the first monitoring node.

16. The non-transitory computer-readable medium of claim 14, wherein the instructions include instructions to:
determine that the load level for at least one other monitoring node meets a condition as compared to the load level for the first monitoring node based on the local namespace and the local viewpoints; and
stop monitoring at least one object being monitored by the first monitoring node.

17. The non-transitory computer-readable medium of claim 14, wherein the instructions include instructions to:
evaluate load constraints to determine whether the load level of the first monitoring system reaches a condition;
stop a discovery of any new objects or removing the at least one object from being monitored by the first monitoring node if the load level of the first monitoring node reaches the condition.

\* \* \* \* \*